United States Patent Office 2,963,755
Patented Dec. 13, 1960

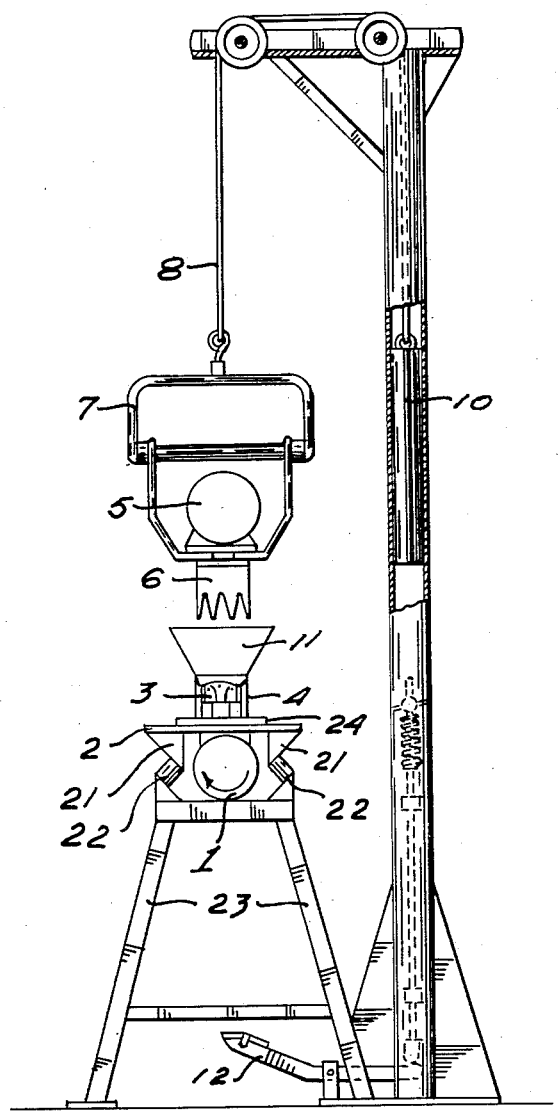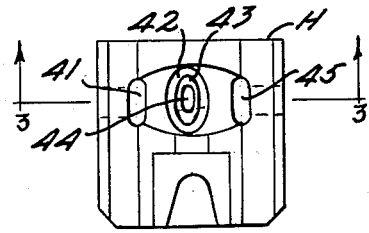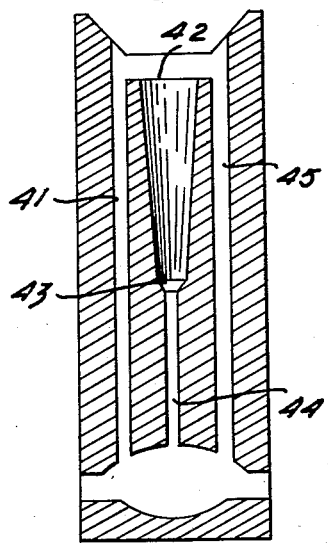
INVENTORS
WILHELM HESSE &
AUGUST DZIEWAS
BY Parker & Philpitt
ATTORNEYS

2,963,755

METHOD OF PRODUCING SMALL MOLDS FOR THE ALUMINO-THERMIC WELDING OF WORKPIECES, ESPECIALLY RAILS

Wilhelm Hesse, Hagen, and August Dziewas, Berlin-Mariendorf, Germany, assignors to Elektro-Thermit, G.m.b.H., Essen, Germany, a corporation of Germany Filed May 13, 1958, Ser. No. 734,876

1 Claim. (Cl. 22—43)

This invention relates to a method of and apparatus for producing casting molds for the aluminothermic welding of workpieces.

Background and problem

In the conventional apparatus for welding workpieces, particularly rails, by the intermediate aluminothermic casting process, prefabricated hardened molds consisting of various ceramic materials are used. Usually two hardened mold halves are inserted into a casting box so that abutting faces of the mold halves are pressed into contact with each other and into contact with the workpieces to be welded. This is achieved by suitable clamping means.

Such prefabricated molds, consisting principally of a cohesive refractory molding sand, have heretofore been hand-made by manually ramming the sand over a mold pattern and then hardening the sand by means of any suitable chemical treatment, such as a combination of waterglass and carbon dioxide, so as to give the casting mold adequate mechanical strength and rigidity.

Unfortunately, however, this manual process of forming the molds has not been entirely satisfactory. First of all, a worker must expend a considerable amount of time and energy in ramming the sand around the mold pattern. This manual labor greatly increases the cost of the mold. Also, when making molds manually, there is a great danger that the mold may be non-uniform, unless the worker making the mold has considerable experience and takes a great deal of care in the preparation of the mold.

Prior art attempts to solve problem

In an effort to avoid the manual work of ramming, and to reduce the time and expense involved in making the mold, prior art workers have attempted to produce the molds with the aid of known press molding, shaking, or ramming machines. However, it has been found that it is not possible to simply apply known shaking techniques and known apparatus to the production of casting molds since such techniques and such apparatus do not produce molds which satisfy the optimum conditions that have been established in alumino-thermic practice in relation to density, refractoriness, distribution of grain size, permeability to gas, clay substance, and moisture. The unsuitability of merely applying conventional shaking techniques is partly due to the fact that the conformation of the cavities inside of the casting molds used for welding rails by intermediate alumino-thermic casting is complicated for reasons connected with the casting technique so that the mechanical consolidation of the cohesive sand by conventional shaking machinery is insufficiently uniform, the ability of the sand to flow being too limited. The non-uniformity in density when using known mold shaking machines gives rise to the formation of pressure variations and hence of soft spots in the molding sand underneath the cores required to produce the necessary cavities, so that the strength of the mold is insufficient to meet the required conditions of use.

Objects

An object of this invention is to overcome the foregoing drawbacks and to enable suitable casting molds to be produced mechanically from refractory cohesive sand. Another object of this invention is to produce molds for the alumino-thermic welding process by utilizing a combination of certain prescribed shaking techniques. Another object of this invention is to produce molds of the stated type by using a combination of two different mold shaking techniques.

The invention broadly

The present invention contemplates making use of certain prescribed shaking techniques. The method according to this invention substantially consists in that when the molding box has been filled with the cohesive molding sand for forming the casting mold, said molding sand is preliminarily compacted by means of a mold base shaking means and then finally shaken down by the simultaneous action of the mold base shaking means and a pendulum-type shaker having a profiled compression head.

Another novel feature of this invention is the modified shape of the gating channels formed in the mold. Conventional channels have a perfectly circular cross-section but it was discovered that channels of this shape were not satisfactory when using the prescribed shaking techniques of this invention. Compaction of the sand around the mold pattern is greatly improved and the channels are reproduced exactly true to the mold pattern, if in accordance with the invention, the cross-section of the channels is either of a flat oval or flat rectangular shape, in such a manner that the longer cross-sectional axis is perpendicular to the upper horizontal surface of the pattern. By giving the channels this shape, the transmission of the pressure applied by the pendulum-type shaker or by hand from above is least intercepted by the metal rods used to form the channels in the mold and the pressure is propagated vertically into the sand.

The drawings

In order to enable the invention to be more readily understood, reference is made to the accompanying drawings which illustrate diagrammatically and by way of example, one embodiment thereof and in which:

Figure 1 is the complete apparatus (with a portion in section) for producing the finished molds by the instant novel technique;

Figure 2 is an end view of the finished mold which clearly shows the shape of the non-circular channels in the mold; and Figure 3 is a section of the finished mold taken along the line 3—3 of Figure 2.

As is shown in Figure 1, the apparatus of this invention comprises as its more essential elements:
 (a) A base shaking means 1,
 (b) An elastically mounted shaked base plate 2,
 (c) A molding box 4,
 (d) A pattern 3,
 (e) A pendulum-type shaking means 5, and
 (f) A compression head 6.

The base shaking means 1 and the pendulum-type shaking means 5 illustrated in the drawings have not been shown in great detail because shaking means of these types are not new, and have been used for various purposes by others. Commercially available shaking means which are suitable for this invention are produced by Lohsenhausen Werk, Dusseldorf, Germany, under the trade name of "Vibromax" shakers.

Shaker plate 2 has a plurality of more or less triangular legs 21 at the corners thereof which are adapted to rest and be mounted upon shock absorbing (e.g. rubber)

mounts 22. Shaker plate 2 is preferably square shaped and the triangular legs 21 are preferably mounted under the four corners thereof. Shock absorbing mounts 22 are in turn fixed to the upper portion of elevated support means 23. Also connected to shaker plate 2 is the base shaking means 1 of the previously described type. The base shaking means 1 is preferably actuated by either an electric motor or an internal combustion engine.

A mold base plate 24 is adapted to rest on the top of shaker plate 2. Immediately above and near the outer edges of the base plate 24 there is located mold box 4 and above that a hopper 11. Also on top of the shaker plate 2 and within the lower part of mold box 4 is positioned the pattern 3 which is used to form the mold.

Suspended directly above the pattern 3 is a pendulum-type shaking means 5 which is supported by bracket 17, stirrup 7, cable 8 and associated counterweight means (not shown in detail) which can suitably be located within hollow tubular upright support 10. The lower portion of pendulum-type shaking means 5 is operatively connected to a profiled compression head 6.

Before the mold forming and shaking process begins, the pattern 3 as well as the profiled compression head 6 are dusted with graphite, petroleum, or some other suitable medium, so as to facilitate detaching the mold from the pattern at the completion of the molding step. When the required quantity of cohesive molding sand has been placed in the molding box 4 through the hopper 11, the sand is first compacted by means of the base shaking means 1 working alone until all the cavities in the pattern have been properly filled. When the sand has been thus shaken down for a few seconds or minutes, the profiled compression head 6 is lowered into the mass of cohesive molding sand. By the operation of a suitable pedal 12 the compression head 6 can be raised and lowered, and the weight of the vertical compression head, assisted by hand pressure, can be brought to bear on the sand while at the same time actuating the pendulum-type shaker 5. Compaction of the sand is finally completed by the simultaneous action of the base shaking means 1, the pendulum-type shaking means 5, and the downward weight of the profiled compression head. Depending upon the size of the mold that is being formed, the shaking process may be performed in one or two stages. When compaction has thus been completed and the sand hopper 11 has been removed, the surplus sand is scraped from the top of the mold box. After removal of the molding box the completed mold can be easily detached from the pattern. The completed casting mold is then hardened in any conventional manner and preferably by a chemical treatment, for instance by immersing the completed mold in waterglass, sulphite liquor, or the like.

The combination of the base shaking means with the pendulum type shaking means in conjunction with the application of the downward pressure of the profiled compression head, as well as the specially modified section of the gating channels permits the time required for making the molds to be greatly reduced, while at the same time the quality of the molds is found to be both uniformly consistent and uniformly improved. Pressure shadows under the cores and consequent soft and loose spots in the sand of the finished mold do not occur if the operations are carried out in the manner hereinbefore described.

Figures 3 and 4 are views of a finished mold produced in accordance with this invention. It will be observed that channels 41, 42, 43, 44 and 45 are of flat oval shape, and the longer cross-sectional axis of these channels is perpendicular to the upper horizontal surface of the mold.

*Novelty and advantages of invention*

One particular aspect of novelty of the present invention results in the cooperative working relationship of the base shaking means and the pendulum-type shaking means in order to produce a superior mold in a shorter period of time than has previously been possible.

Compared with the conventional ramming methods heretobefore employed in this art, the present invention allows molds to be produced up to 7 times as fast as formerly, thus requiring much less manpower and a lowered cost per mold. In addition to efficiency in both time and money the present invention results in a mold which has a breaking strength which is twice that of the best handmade molds.

In conclusion, while the foregoing specification and drawing describe the construction, operation and use of one preferred embodiment of the instant invention, it is to be understood that we do not intend to limit ourselves to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly it is intended to encompass all changes, variations, modifications and equivalents falling within the scope of the appended claim.

What is claimed is:

An apparatus for producing molds to be used in the alumino-thermic welding of workpieces which comprises:

(a) a base plate for supporting a mold box and a mold pattern thereabove, (b) a first circular mechanical shaking means operatively connected to said base plate and having its rotational axis arranged parallel to the plane of the base plate so as to impart vertical vibration and facilitate the settling of mold sand around said mold pattern, (c) a profiled compression head of irregular outline located above said base plate and being adapted to be brought into close proximity to said base plate, (d) a second mechanical shaking means which is operatively connected to said profiled compression head, (e) said second mechanical shaking means and said profiled compression head being supported by means of a flexible cable means, and (f) means for simultaneously activating said first and second mechanical shaking means.

References Cited in the file of this patent

UNITED STATES PATENTS

| | | |
|---|---|---|
| 868,957 | Woods | Oct. 22, 1907 |
| 956,939 | Carter | May 3, 1910 |
| 1,814,416 | Stoney | July 14, 1931 |
| 2,272,816 | Oyster | Feb. 10, 1942 |
| 2,353,492 | O'Connor | July 11, 1944 |
| 2,542,243 | Gedris | Feb. 20, 1951 |
| 2,817,127 | Beech | Dec. 24, 1957 |

FOREIGN PATENTS

| | | |
|---|---|---|
| 858,813 | France | May 20, 1940 |